UNITED STATES PATENT OFFICE.

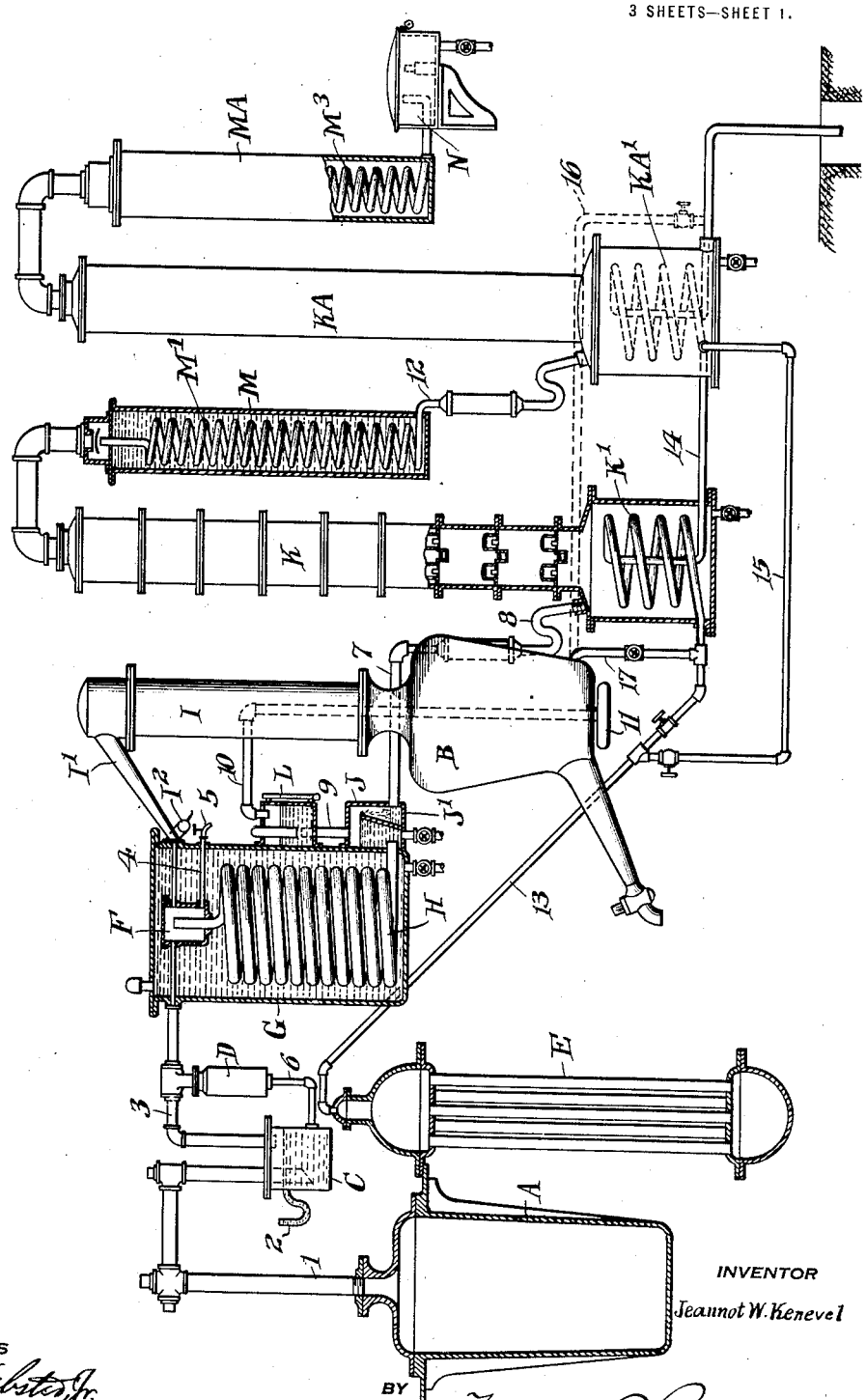

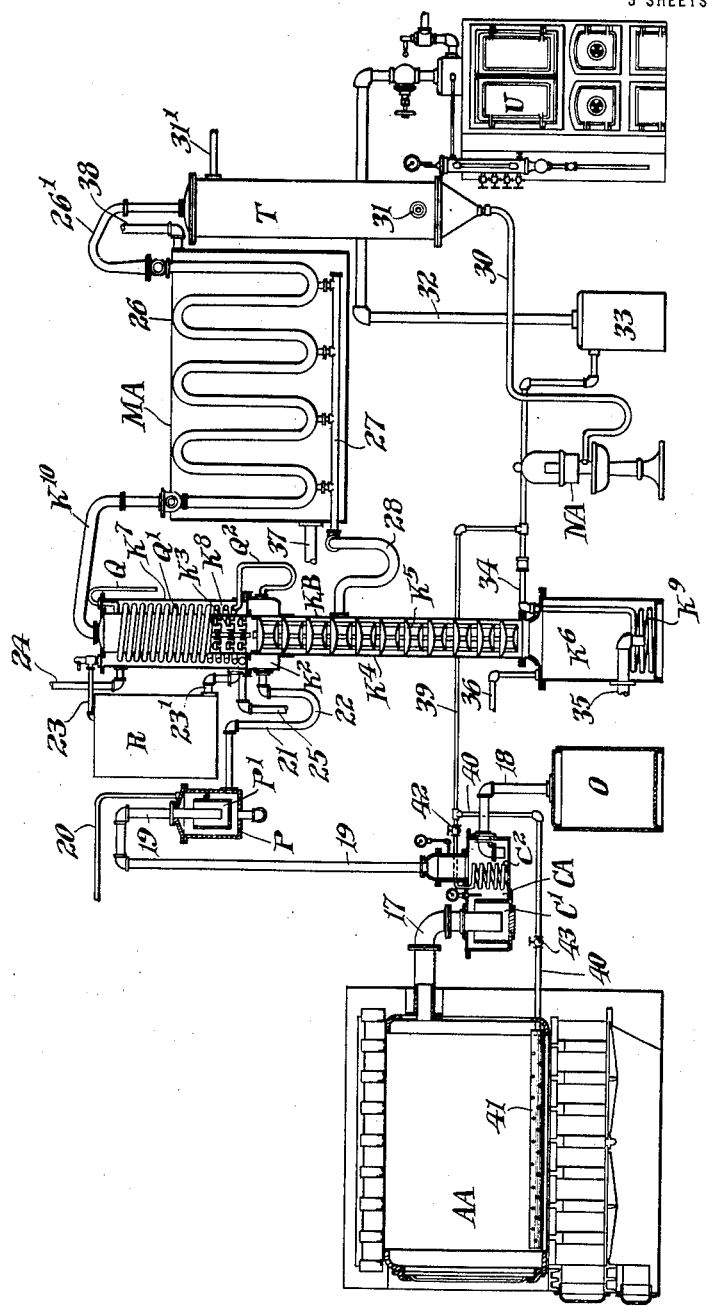

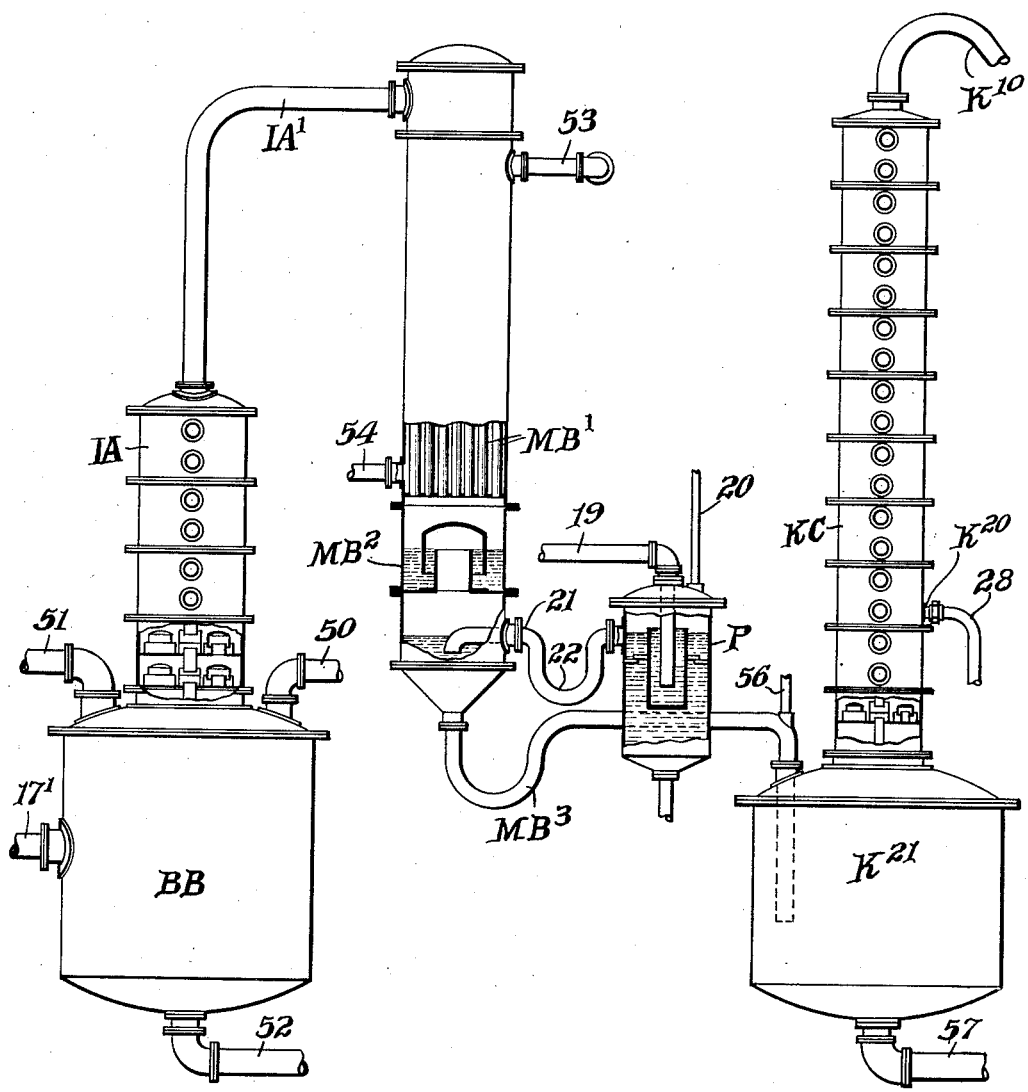

JEANNOT W. KENEVEL, OF PHILADELPHIA, PENNSYLVANIA, ASSIGNOR TO DISTOL MANUFACTURING COMPANY, OF WILMINGTON, DELAWARE, A CORPORATION OF DELAWARE.

PROCESS OF AND APPARATUS FOR MAKING DENATURED SPIRIT.

1,176,150. Specification of Letters Patent. Patented Mar. 21, 1916.

Application filed May 17, 1911. Serial No. 627,712.

*To all whom it may concern:*

Be it known that I, JEANNOT W. KENEVEL, a citizen of the United States of America, residing in the city and county of Philadelphia, in the State of Pennsylvania, have invented a certain new and useful Improvement in Processes of and Apparatus for Making Denatured Spirit, of which the following is a true and exact description, reference being had to the accompanying drawings, which form a part thereof.

My present invention relates to processes of distillation, and apparatus for carrying out the same, and the primary object of my invention is the economical manufacture of a homogeneous liquid product formed mainly or largely from vapors of ethyl alcohol but containing constituents whereby the product while generally similar to ethyl alcohol (hydrated oxid of ethyl) and equally valuable with ethyl alcohol for most purposes in the arts for which ethyl alcohol is or may be employed, is not, and cannot by any practical method be readily converted into a potable spirit, or one suitable for medicinal purposes.

A further object of my invention is to provide apparatus and processes by means of which the production of denatured spirit may be carried on automatically and continuously except for the usual care with regard to the supplying of raw material, the discharge of waste material and the maintenance of the proper temperature conditions to effect the reaction of the materials undergoing treatment and the vaporization and condensation of the varied constituents thereof.

Broadly speaking, the process of my invention involves the destructive distillation of such carbonaceous organic materials as flesh, bones, coal, lignite, peat, wood and other cellular vegetable materials, such as corn stalks, weeds and grain straw, which, when so distilled, yield vapors composed of hydrocarbons, either free or mixed with nitrogenous compounds and condensing at temperatures in the neighborhood of that at which ethyl alcohol condenses. The temperature at which this destructive distillation is carried out will depend upon the material subjected to the distillation, but in general, it should be carried out at such temperatures and under such conditions as to produce a proportionately large yield of the desirable denaturant constituents which are those which condense at temperatures at or about the rectification temperature of high proof ethyl alcohol, and are soluble in the denatured spirit ultimately produced, and in practice this means those soluble in ethyl alcohol.

In addition to the destructive distillation of carbonaceous organic material the invention involves also the generation of the alcoholic vapors from fermented materials, the mixture of these vapors with the vapors obtained by the destructive distillation step, or at least all constituents thereof which are soluble in the denatured spirit produced, and condense at temperatures at or about the rectification temperature of high proof ethyl alcohol.

The invention includes as a final step the rectification of the mixture.

While the steps referred to are all essential to my process they need not be carried out as separate and distinct steps, and, in practice, I prefer to condense all of the vapors from the destructive distillation of the organic material which condense at temperatures of about 200° Fahr. or below, prior to any mixture with ethyl alcohol and then pass the condensate or a portion of it as hereinafter explained, into a suitable distilling and rectifying apparatus into which the ethyl alcohol into which ethyl alcohol is introduced as vapors or as unrectified high wines or in which ethyl alcohol vapors are generated from fermented materials. In practice also, I prefer to separate from the condensed vapors produced by destructive distillation and passed to the distilling and rectifying apparatus, the heavy tarry liquids condensing readily at or above about 210° to 220°, Fahrenheit, and also the substances which are gaseous at ordinary atmospheric temperatures. More or less valuable by-products may be obtained from the liquids and to some extent also from the gaseous materials thus separated out and the gaseous materials have a fuel value.

Except for the partial purification referred to, I consider it not only unnecessary, but in general, undesirable to otherwise refine or purify the products of the destructive distillation prior to their admixture with ethyl alcohol vapors and the rectification of the mixture for most if not all of the numerous different constituents of the residue including some present in relatively minute quantities add, or add to, some noxious property of the ultimate denatured spirit produced.

By mixing the condensate from the destructive distillation with the fermented material in the preferred manner specified I avoid the formation of vapors at any stage of the operation which can be condensed as ethyl alcohol free from the denaturants, a desirable consideration as it tends to simplify and reduce the inspection and care necessary to avoid possible evasions of the excise regulations affecting the manufacture of alcoholic spirits. The generation of the vapors from the fermented material in the presence of the denaturant vapors I consider advantageous also, because I believe that this tends to the production of a more perfectly homogeneous ultimate product, and tends also I believe, to make the product more difficult to free from its denaturants.

When the organic material subjected to the destructive distillation in the process described is wood, or of a woody nature, a main constituent of the denaturant is methyl alcohol, but the vapors resulting from this distillation and eventually combined or dissolved in the denatured spirit, ordinarily and advantageously comprise also methyl acetate, furfurol, the mixture of phenols, known as creosote and other bodies of tarry and empyreumatic odor, formic aldehyde, acetone, and appreciable through minute quantities of formic acid, proprionic acid, butyric acid, valerianic acid, acetate of ammonia, methylamin and allyl alcohol and to obtain these substances in relatively large amounts it is desirable that the destructive distillation of wood or woody materials should be carried on at a temperature ranging from about 300° to about 530° Fahrenheit, and it should be explained at this point that when the wood or woody materials subjected to the destructive distillation is of a resinous character it is advisable to first treat the wood to free it in a large measure from turpentine and the terpenes, partly because of the value of these by-products and partly also because turpentine and the terpenes do not form suitable denaturants.

In preparing the denaturant constituents in accordance with the present invention by the destructive distillation of peat, the temperature at which the distillation should be carried on, and the resultant products are much the same as those prevailing and obtained in the destructive distillation of wood.

When coal is the carbonaceous organic material subjected to destructive distillation the latter should be carried on preferably at a dull red heat of say in the neighborhood of 1200° Fahrenheit. The most important denaturants obtained from the destructive distillation of coal are believed to be those known as crude benzol, including benzene, toluene and xylene.

When shale and lignite are subjected to destructive distillation in order to provide denaturants in accordance with the present invention the temperature at which these substances are distilled, and in a general way the products also are intermediate of those prevailing and obtained in the destructive distillation of wood and coal.

When flesh or bone material is destructively distilled to provide denaturants in accordance with the present invention the temperature at which the distillation process is carried out should be about the same as that when coal is used—and the most important of the denaturant constituents are pyridin bases.

It will be understood that two or more of the different substances referred to as suitable sources of denaturants produced by destructive distillation, may be simultaneously distilled to provide the denaturants for a single resulting product, and that in some cases it will be advantageous, either because of the particular use to which the ultimate product is to be put or from reasons of economy in the cost of raw material, to use one or more of these substances to the exclusion of the others. For ordinary practical purposes I consider wood and materials of a woody nature to be the most suitable substances to be destructively distilled for the production of denaturants in accordance with the present invention. The wood oil brought over during the destructive distillation of wood materially increases the calorific value of the final product.

In the claims annexed to and forming a part of this specification I have aimed to point out with particularity the various novel elements and combinations comprising my invention. For a better understanding of the invention, however, and the advantages possessed by it, reference should be had to the accompanying drawings and descriptive matter in which I have illustrated and described forms of apparatus and methods advantageously employed in carrying out the invention.

Of the drawings, Figure 1 is a diagrammatic representation of one form of apparatus constructed in accordance with and suitable for carrying out the present invention. Fig. 2 is a similar representation of another form of apparatus, and Fig. 3 is a partial representation of a third form of apparatus.

In the drawings, and referring first to the apparatus shown in Fig. 1, A represents a suitable vessel or retort in which wood or other suitable material may be destructively distilled, and such vessel may be mounted in a suitable fire chamber and heated in any approved manner. Such chamber may have a grate upon which a fire may be built and maintained with ordinary fuel. The products of combustion from such fire may be conducted through a suitable channel or passage (not shown) to a suitable chamber in which an ordinary pot still B may be mounted, or if desired, a beer still may be used. This still may be of the usual type, capable of distilling ethyl spirit from suitable material, such as apples, potatoes, grain, cornstalks and any other fermentable material, suitably prepared in the form of mash. This still may be heated by the products of combustion from the combustion chamber of the retort A, or I may provide an independent fire for the same. After performing their desired function, the products of combustion may escape by way of a suitable chimney (not shown). The vapors from the destructive distillation of the wood or other material in the retort A pass to a pipe 1 and from the latter to a catch-all C. Such vapor carries in addition to the pyroligneous acid, acetones and various other materials valuable for their denaturant properties a large amount of tarry residue which condenses readily at or above temperatures of 210°–220° Fahrenheit. It is desirable to separate from such vapor as many of these high temperature condensation products as possible and they may collect in said catch-all which may be maintained at a temperature of about 210° to 220° Fahrenheit. The condensate collecting in the catch-all may overflow therefrom through a pipe 2. The uncondensed vapors from the retort pass from said catch-all to a pipe 3 leading to the rest of the apparatus.

The products of combustion from the fire chamber in addition to heating the pot still, may circulate around a tubular boiler E in which steam is generated and employed as the medium for heating and distilling columns to which the condensed vapor is conducted in its passage through the apparatus. From the pipe 3 the vapor is passed to a common reservoir or receiver F mounted in a suitable condensing chamber G which may be filled with water or any other desired cooling medium. A coil H leads from the reservoir F; the inlet to such coil being disposed near the top of the reservoir as indicated. The purpose of this coil will be more fully described hereinafter. The reservoir F may be provided with a discharge pipe 4 having a suitable cock 5, to drain any condensation therefrom. I preferably dispose in said pipe 3 another collector D' for any tarry residue carried over by the vapor which collector communicates with the catch-all C by means of a pipe 6.

Meanwhile the pot still B has been generating a vapor, normally condensable into an ethyl spirit, which vapor is passed through a suitable dephlegmator or boiling head I; the low temperature condensation products escaping therefrom passing in a vaporous form through a pipe I' to the receiver F where they mix with the vapor from the distilling wood, or other source of a denaturizing vapor. In this common receiver or reservoir the ethyl and methyl spirit vapors become thoroughly commingled and lose their original identity in a vapor that finally condenses as a denatured alcohol, incapable, practically of being purified to an ethyl form. It will be understood that the proportions of the vapor mixed in said receiver may vary, and in all instances the ethyl vapor may be in excess of the methyl vapor since but a relatively small quantity of the latter is necessary for admixture with the former for the purpose of denaturization.

The delivery pipe I' from the dephlegmator I to the receiver F is sealed at $I^2$ against tampering, in order that no ethyl spirit may be independently condensed in contravention of the law concerning the distillation of any and all spirit vapors.

From the receiver or reservoir F the combined vapor passes to the coil H in which it is condensed and from said coil the condensed body discharges into a box J, such box having a baffle plate or weir J' in order that a certain height of liquid may be maintained in said box. From the box J the body of condensed vapor passes via a pipe 7 trapped at 8 to the base of a column still K. The body of condensed vapor passing from the coil H carries with it certain inflammable gases, and the use of the baffle plate which causes the liquid to form a seal effects the separation of these gases therefrom which discharge into a suitable vessel L which may be mounted directly above the box J and connected thereto by a pipe 9, such pipe having its discharge end sealed by condensed liquid or water within the vessel L. The gas discharged within this receptacle L may be subsequently conveyed by means of pipe 10 to a burner 11 disposed beneath the pot still B.

From the column still K the vapor rising therein from the condensed spirit passes to a condenser M where it enters a cooling coil M' and from which it discharges via a trapped pipe 12 to the base of a second boiling head KA, from the top of which it enters a second condenser MA, and from the cooling coil $M^3$ of the latter it passes to the usual try box N from which it may be discharged in any usual manner.

The column stills K, KA are heated by steam which is delivered from the tubular boiler E through a pipe 3 to a coil K' in the base of the first column still K and from the latter through a pipe 14 to a coil KA' in the base of the second column still KA, or if desired, I may provide a bypass 15 so that either or both column stills may be supplied with live steam. A boiler such as shown may be heated by products of combustion from the fire employed to heat the retort for the production of steam, or steam from any suitable source of supply may be used for this purpose. The exhaust steam from the base of the second column still may be discharged to the atmosphere, or it may be returned through a pipe 16 to the pot still, (or a beer still when the latter is employed) for the purpose of generating the ethyl vapor. Instead of employing the exhaust steam for the purpose of heating the pot still or beer still B, I may provide a pipe 17 which leads directly from the main steam pipe to said pot or beer still.

The apparatus shown in Fig. 1 is particularly intended for farm use and in units of comparatively small size and it is practically possible to make such apparatus as is shown in Fig. 1 portable so that it may be mounted on a wagon.

The apparatus shown in Fig. 2 is of a more complete and efficient type than that shown in Fig. 1 and is intended for use in carrying out the most approved form of my method in which there are first separated out from the products from the destructive distillation of the organic carbonaceous materials, the heavy tarry liquids and other substances readily condensable at temperatures appreciably above the final rectification temperature of high proof alcohol, and then the substances which are gaseous at ordinary atmospheric temperatures; the remaining products are then passed into the rectifying apparatus wholly or largely in the form of liquids and are mixed in the rectifying apparatus with the beer or diluted mash from which the ethyl vapors are generated, the mixture being thereafter distilled and rectified.

In the apparatus shown in Fig. 2 the retort in which wood, coal, or other organic carbonaceous material is subjected to destructive distillation is indicated by AA and may be of any form suitable for the purpose except that I prefer to provide means as the pipe 41 and connections for injecting steam into the retort proper to regulate the temperature therein as hereinafter explained. The vapors resulting from the destructive distillation carried on in the retort AA pass through the pipe 17 to a catch-all CA provided with a chamber C' serving to maintain at all times a liquid seal about the inserted end of the pipe 17. The temperature within the catch-all is maintained at such a regulated temperature, say about 210° to 220° Fahrenheit, that no condensation will take place therein except of the heavy tarry liquids and other substances which it is desired to condense and remove at this point. To regulate the temperature within the catch-all CA a coil $C^2$ may be provided into which a temperature regulating fluid, as steam, is admitted as conditions require. The heavy tarry liquids and other materials condensing and collecting in the catch-all CA overflow through the pipe 18 into a reservoir O. The uncondensed vapors escape from the catch-all CA through the pipe 19 which leads to a second catch-all P containing a chamber P' serving to maintain a liquid seal about the lower end of the pipe 19. The arrangement of the apparatus should be such that all of the vapors passing into the catch-all P through the pipe 19 are condensed therein except the constituents of those vapors which are gaseous at ordinary atmospheric temperatures. On this account I consider it necessary in some instances to provide the catch-all P with special cooling apparatus for the vapors entering it, though where the pipe 19 is comparatively long the loss of heat into the atmosphere from the pipe and the catch-all itself may be relied upon to effect the desired condensation within the catch-all P. The vapors and gases which are not condensed within the catch-all P may escape from the latter through the pipe 20 and may be utilized either by recovering their valuable constituents in suitable apparatus or by burning them and utilizing the heat thereby generated or partly in one way and partly in the other. The condensate formed and accumulating in the catch-all P flows from the latter through the pipe 21 containing the seal loop 22 to the mixing chamber $K^2$ of the distilling and rectifying column KB. The column KB comprises an upper boiling head $K^3$, a column $K^4$ containing baffles $K^5$ and a base chamber $K^6$ at the lower end of the column $K^5$. A jacket $K^7$ surrounds the boiling head $K^3$ and is separated therefrom by a space $K^8$. The beer or diluted mash is supplied to the chamber $K^2$ through the pipe Q and coil Q', the latter being located within the space $K^8$. The coil Q' is connected at its lower end as through the seal loop $Q^2$ to the chamber $K^2$. In order to maintain a proper temperature in the space $K^8$ provisions, as the steam supply pipe 24 and the waste pipe 25 may be made for supplying steam to this space and drawing off water of condensation. The tank R connected at its upper end to the space $K^8$ by a pipe 23 and to the lower end of this space by a pipe $23^1$ serves as an equalizing and heat storing receptacle, which with the space $K^8$ and the connections between them provide a steam or steam and water circulating system.

The chamber $K^2$ opens to the interior of the boiling head at the lower end of the latter and to the interior of the column $K^4$ at the upper end of said column. Steam is supplied to the chamber $K^6$ through the open lower end of coil $K^9$, the upper end of which is connected to supply pipe 34. The supply pipe 34 leads from a reservoir 33 to which steam is supplied by the pipe 32 from a suitable boiler U. From the lower end of the chamber $K^6$ there leads a discharge pipe 35 which may be controlled by any usual or suitable means, not shown. To the upper end of the chamber $K^6$ is connected a vapor sampler tube 36, running to sampling apparatus, not shown.

The spirit distilled and rectified within the apparatus KB passes out of the upper end thereof through the pipe $K^{10}$ to the doubler MA, the pipe $K^{10}$ being connected to the looped pipe or series of goose necks 26, located within the casing of the doubler MA. The lower end of the loops of the pipe 26 are connected to a drain pipe 27 which discharges into the column body $K^4$ through the looped seal pipe 28.

37 and 38, represent inlet and outlet connections to the casing of the doubler MA through which water is circulated about the goose necks 26 to maintain the doubler at the desired temperature of between 165° and 185° Fahrenheit, and ordinarily about 178° Fahrenheit, for the final rectification of the denatured spirit. From the outlet end of the goose necks the denatured spirit, freed from water, passes through the pipe 26 to the condenser T wherein the spirit is condensed in the usual condensing coil or worm contained therein.

31 and 31', represent the inlet and outlet connections to the condenser T for cooling water, by means of which the temperature in the condenser is maintained at about 60° or 70° Fahrenheit, as is usual in condensing ethyl alcohol. The condensed spirit passes through the pipe 30 to the final apparatus NA where the condensed spirit is discharged and the vapors passing through the condenser T without condensation are permitted to escape. The steam pipe 34 is shown as having branches 39 and 40 running to the coil $O^2$ and to the perforated tube 41 located within the retort AA. The branch pipes 39 and 40 are controlled by suitable valves 42 and 43 respectively. The pipe 41 is employed to inject steam into the retort AA in order to regulate the temperature thereof and it is particularly useful when wood or materials of a woody nature are being destructively distilled therein and for one reason or another the temperature in the retort rises too high to obtain the best results, steam then being supplied to lower the temperature in the retort.

The spent liquor discharge from the distilling and rectifying column KB through the pipe 35 contains a small quantity of alcohol and appreciable quantities of substances carried into the distilling apparatus from the destructive distillation apparatus and I have found that excellent results may be obtained by employing this spent liquor in cooking or otherwise preparing the vegetable materials fermented to furnish the ethyl alcohol vapors. The use of the spent liquor for this purpose I believe to be advantageous because the use of the liquor materially hastens the fermentation; and also because the noxious materials thus admixed to the mash in effect poisons the latter and not only makes it impossible to generate pure undenatured ethyl alcohol from the mash, but results I believe in the utilization in the ultimate product of some of the noxious and hence desirable substances contained in the spent liquor.

The apparatus shown in Fig. 3 is devised to carry out a form of my invention in which, after the elimination of the heavy tarry impurities and the substances gaseous at ordinary atmospheric temperatures and pressures, the remaining products of the destructive distillation are introduced in liquid form into a distilling and rectifying apparatus into which is introduced also unrectified high wines produced in a separate still by the distillation of fermented vegetable material. In this form of apparatus BB, represents the still for distilling the fermented vegetable matter. 51, represents the conduit through which the beer or mash is introduced into the still. 50, the conduit through which the vapor for sampling may be withdrawn. 17', the steam supply pipe, and 52, the spent liquor discharge pipe. The still BB is provided with a dephlegmator IA from the top of which leads the vapor discharge pipe IA' which discharges its contents into the upper end of the condenser MB. From the upper end of the condenser MB the vapors and condensate pass down through pipes MB' around which circulates water admitted through pipe 54 discharged through the pipe 53. The vapors after being condensed in the tubes MB' pass through the hydraulic seal $MB^2$, and in the lower end of the shell of the condenser MB are mixed with the destructive distillation condensate. The latter is passed into the lower end of the condenser MB through the pipe 21, including the seal 22 from the catch-all P, which may be identical with the catch-all P of Fig. 2 and may be connected to a retort for the destructive distillation, as in Fig. 2. The mixture of high wines condensed in the condenser MB and products supplied through the pipe 21 are conveyed through the conduit $MB^3$ to the bottom chamber $K^{21}$ of a distilling and rectifying column KC. To facilitate the flow through the conduit $MB^3$, as well as to supply heat for effecting the distillation and rectification carried on in the column KC, a steam injector connection 56 is made to the pipe MB³ adjacent its discharge end. The portion K²⁰ of the distilling and rectifying column KC may be substantially identical with the portions K⁴ and K⁸ of the column KB of Fig. 2, except that the jacket K⁷ and connections pertaining to the space inclosed thereby of Fig. 2, are omitted in Fig. 3. The combined vapors pass from the top of the column KC through the pipe K¹⁰ to a suitable doubler and condenser apparatus, which may be identical with the doubler MA and condenser T of Fig. 2. The liquid condensed in this doubler is returned to the column KC through the pipe 28.

With the apparatus shown in Fig. 3 the hydraulic seal maintained at MB² avoids all possibility of the products from the destructive distillation blowing back into the still BB, and the spent liquor from the latter is not necessarily contaminated by admixture with the products from the destructive distillation. This is of importance when it is desired to use the waste products of the still BB for cattle feeding and some other purposes. In the apparatus of Fig. 3, as well as in that of Figs. 1 and 2, the denatured spirit is condensed from a vapor mixture containing vapors of ethyl spirit and vaporized denaturants, and is produced continuously and in closed apparatus, which may be, and as shown, is, of such construction that it is practically impossible to withdraw ethyl spirit unmixed with denaturants.

The denatured spirit produced by the process described contains noxious and poisonous constituents which effectively prevent its use as a potable spirit or for medicinal purposes and it may readily be distinguished from undenatured spirit both by chemical analysis and without such analysis on account of its repugnant pyroligneous odor and the irritating effect of the fumes given off when open to the atmosphere. Except as noted, however, the denatured spirit can be used for practically all purposes for which undenatured ethyl spirit is suitable and with equally good results. In particular the new spirit has practically the same solvent properties and the same fuel value as ethyl alcohol. It possesses in common with ethyl alcohol the desirable characteristic for a safe liquid fuel that when flaming the flames may be extinguished by throwing water on them. My improved denatured spirit is not claimed herein, however, but is claimed in my co-pending application, Serial No. 661,229, filed November 20, 1911 as a division of this case.

A very important practical advantage of the invention arises from the fact that the denaturization may be carried out at a comparatively low cost since the denaturant constituents may be obtained by the destructive distillation of carbonaceous material of low cost, and indeed, as already pointed out, by the use of various farm refuse, and, furthermore, the process may be carried out in a way by the use of apparatus which is in itself simple and which makes inspection by excise agents practically unnecessary or at the very least reduces such inspection to a minimum.

Having now described my invention what I claim as new and desire to secure by Letters Patent, is:

1. The method of forming a denatured spirit which consists in destructively distilling carbonaceous organic material, generating vapors of ethyl alcohol, effecting a vapor mixture of the ethyl alcohol with vaporized products of the destructive distillation, and rectifying and condensing said spirit from the vapor mixture.

2. The method of forming a denatured spirit which consists in destructively distilling carbonaceous organic material, generating vapors of ethyl alcohol, effecting a vapor mixture of the ethyl alcohol with vaporized products of the destructive distillation, and rectifying and condensing said spirit from the vapor mixture, eliminating from said products prior to the mixture, products gaseous at ordinary atmospheric temperatures.

3. The method of forming a denatured spirit which consists in destructively distilling carbonaceous organic material, generating vapors of ethyl alcohol, effecting a vapor mixture of the ethyl alcohol with vaporized products of the destructive distillation, and rectifying and condensing said spirit from the vapor mixture, eliminating from said products prior to the mixture, products condensing at temperatures in the neighborhood of, and above the boiling temperature of water.

4. The method of forming a denatured spirit which consists in generating and mixing vapors of ethyl alcohol and the vapors of those products of the destructive distillation of carbonaceous organic material and having boiling points in the neighborhood of the boiling point of ethyl alcohol, and rectifying and condensing said spirit from said mixture.

5. The method of forming a denatured spirit which consists in destructively distilling carbonaceous organic material, eliminating from the substances vaporized thereby those condensing at temperatures in the neighborhood of and above the boiling temperature of water, and those which are gaseous at ordinary atmospheric temperatures, condensing the residue, mixing the condensate thus obtained with fermented vegetable matter, distilling the mixture and rectifying and condensing the distillate.

6. The method of forming a denatured spirit which consists in destructively distilling wood, distilling fermented vegetable matter to generate vapors of ethyl alcohol, effecting a vapor mixture of the ethyl alcohol with vaporized products of the destructive distillation, and rectifying and condensing said spirit from the vapor mixture.

7. The method of forming a denatured spirit which consists in destructively distilling wood, distilling fermented vegetable matter to generate vapors of ethyl alcohol, effecting a vapor mixture of the ethyl alcohol with vaporized products of the destructive distillation, and rectifying and condensing said spirit from the vapor mixture, eliminating from said products prior to the mixture, products gaseous at ordinary atmospheric temperatures.

8. The method of forming a denatured spirit which consists in destructively distilling wood, distilling fermented vegetable matter to generate vapors of ethyl alcohol, effecting a vapor mixture of the ethyl alcohol with vaporized products of the destructive distillation, and rectifying and condensing said spirit from the vapor mixture, eliminating from said products, prior to the mixture, products condensing at temperatures in the neighborhood of and above the boiling temperature of water.

9. The method of forming a denatured spirit, which consists in subjecting wood to destructive distillation at a temperature of 330° to 530° Fahrenheit, eliminating from the substances vaporized thereby those which condense at temperatures at or above the boiling point of water and those which are gaseous at ordinary atmospheric temperatures, effecting a vaporized mixture of the residue with ethyl alcohol, and rectifying and condensing said spirit from the mixture.

10. The method of forming a denatured spirit, which consists in subjecting wood to destructive distillation at a temperature of from 330° to 530° Fahrenheit, condensing out of the vapors products, and eliminating those substances which have boiling temperatures in the neighborhood of and above that of water, condensing from the residue those substances which condense at ordinary atmospheric temperatures, eliminating the uncondensed vapor, mixing the condensate last obtained with a fermented mash, distilling the mash containing mixture, rectifying the distillate and condensing therefrom the denatured spirit.

11. The method of forming a denatured spirit, which consists in subjecting wood to destructive distillation at a temperature of from 330° to 530° Fahrenheit, condensing out of the vapors products and eliminating those substances which have boiling temperatures in the neighborhood or above that of water, condensing from the residue those substances which condense at ordinary atmospheric temperatures, eliminating the uncondensed vapor, mixing the condensate last obtained with a fermented mash, and distilling, rectifying and condensing the mash containing mixture, rectifying the distillate and condensing therefrom the denatured spirit, and utilizing the spent liquor of the distillation and rectification of the mash mixture in the preparation of the fermented mash employed.

12. The method of forming a denatured spirit which consists in distilling fermented vegetable matter, destructively distilling carbonaceous organic matter, effecting a vaporous mixture comprising all products of the two distillations which do not condense at or above the temperature of the boiling point of water and which are not gaseous at ordinary atmospheric temperatures and rectifying and condensing the denatured spirit from said mixture.

13. The method of forming a denatured spirit which consists in destructively distilling carbonaceous organic matter, passing products vaporized by said distillation into a distilling and mixing chamber, distilling fermented vegetable matter in said chamber and condensing the denatured spirit from the vapor mixture effected in said chamber.

14. Apparatus for producing a denatured spirit, comprising in combination a still for the destructive distillation of carbonaceous organic matter, a still for distilling fermented vegetable matter and rectifying and condensing apparatus connected to both stills into which the vapors of substances vaporized in both of said stills pass, and in which the denatured spirit is rectified and condensed.

15. Apparatus for producing a denatured spirit comprising in combination a still for the destructive distillation of carbonaceous organic matter, a second still adapted for the distillation of fermented vegetable matter, rectifying and condensing apparatus connected to said second still, means for supplying fermented vegetable matter to said second still, and a conduit connection between said stills for conveying products vaporized in the first mentioned still to said second still.

16. Apparatus for producing a denatured spirit comprising in combination a still for the destructive distillation of carbonaceous organic matter, a second still adapted for the distillation of fermented vegetable matter, rectifying and condensing apparatus connected to said second still, means for supplying fermented vegetable matter to said second still, and a conduit connection between said stills for conveying products vaporized in the first mentioned still to said second still, said connection including provisions for condensing and separating out those products of the destructive distillation which condense at temperatures in the neighborhood of and above the boiling temperatures of water.

17. Apparatus for producing a denatured spirit comprising in combination a still for the destructive distillation of carbonaceous organic matter, a second still adapted for the distillation of fermented vegetable matter, rectifying and condensing apparatus connected to said second still, means for supplying fermented vegetable matter to said second still and a conduit connection between said stills for conveying products vaporized in the first mentioned still to said second still, said connection including provisions for diverting from said second still the products of the first mentioned still which are gaseous at ordinary atmospheric temperatures.

18. Apparatus for producing a denatured spirit comprising in combination a still for the destructive distillation of carbonaceous organic matter, a second still adapted for the distillation of fermented vegetable matter, rectifying and condensing apparatus connected to said second still, means for supplying fermented vegetable matter to said second still and a conduit connection between said stills for conveying products vaporized in the first mentioned still to said second still, said connection including provisions for maintaining a hydraulic seal to the path of the vapor products from the first mentioned still with a liquid discharge therefrom and provisions for maintaining said seal at a temperature in the neighborhood of the boiling temperature of water.

19. Apparatus for producing a denatured spirit comprising in combination a still for the destructive distillation of carbonaceous organic matter, a second still adapted for the distillation of fermented vegetable matter, rectifying and condensing apparatus connected to said second still, means for supplying fermented vegetable matter to said second still and a conduit connection between said stills for conveying products vaporized in the first mentioned still to said second still, said connections being adapted to condense the vapor products from the first still, except those which are gaseous at ordinary atmospheric temperatures, with provisions for eliminating the latter.

20. Apparatus for producing a denatured spirit comprising in combination a still for the destructive distillation of carbonaceous organic matter, a second still adapted for the distillation of fermented vegetable matter, condensing apparatus connected to said second still, means for supplying fermented vegetable matter to said second still, and a conduit connection between said stills and provisions associated therewith for first condensing and eliminating the products of the destructive distillation condensing at temperatures in the neighborhood of and above the boiling temperature of water, and for thereafter condensing the remaining products, except those gaseous at ordinary atmospheric temperatures and for discharging the condensate thus formed into said second still and for diverting from said second still said products gaseous at ordinary atmospheric temperatures.

JEANNOT W. KENEVEL.

Witnesses:
ARNOLD KATZ,
S. STEWART.